United States Patent [19]

Lee et al.

[11] Patent Number: 4,632,910

[45] Date of Patent: Dec. 30, 1986

[54] SINTERED MATERIAL OF SILICON NITRIDE FOR CUTTING TOOLS AND PROCESS THEREFOR

[75] Inventors: June-Gunn Lee; Young-Wook Kim; Tae-Hee Park; Long Choi, all of Seoul; Sang-Ho Lee; Kam-Yong Jang, both of Taejon, all of Rep. of Korea

[73] Assignee: Korea Advanced Institute of Science and Technology, Seoul, Rep. of Korea

[21] Appl. No.: 738,950

[22] Filed: May 29, 1985

[30] Foreign Application Priority Data

May 29, 1984 [KR] Rep. of Korea .................... 2968/84

[51] Int. Cl.$^4$ .............................................. C04B 35/58
[52] U.S. Cl. ...................................... 501/97; 82/1 C; 264/60; 264/332; 427/215; 428/404; 428/698; 501/87; 501/96; 501/98
[58] Field of Search ................ 428/404, 698; 427/215; 51/307, 308, 309; 264/60; 82/1 C; 501/87, 96, 98, 97

[56] References Cited

U.S. PATENT DOCUMENTS

| | | | |
|---|---|---|---|
| 4,280,973 | 7/1981 | Moskowitz et al. | 51/307 |
| 4,425,141 | 1/1984 | Buljan et al. | 51/309 |
| 4,462,817 | 7/1984 | Wolfe et al. | 264/332 |
| 4,497,228 | 2/1985 | Sarin et al. | 51/307 |

FOREIGN PATENT DOCUMENTS

| | | | |
|---|---|---|---|
| 56-32377 | 4/1981 | Japan. | |
| 57-205374 | 12/1982 | Japan. | |
| 57-205376 | 12/1982 | Japan. | |
| 58-95662 | 6/1983 | Japan. | |
| 58-199782 | 11/1983 | Japan. | |
| 1601224 | 10/1981 | United Kingdom | 428/698 |
| 2095702 | 10/1982 | United Kingdom | 428/698 |

*Primary Examiner*—Helen M. McCarthy
*Attorney, Agent, or Firm*—Birch, Stewart, Kolasch & Birch

[57] ABSTRACT

A sintered material based on silicon nitride for use in preparing cutting tools is provided. This material is prepared by sintering a mixture of silicon nitride containing 2–10 percent by weight of yttrium oxide, 1–5 percent by weight of aluminium oxide and 10–40 percent by weight of titanium carbide coated with titanium nitride under hot pressing or sintering followed by hot isostatic pressing at an elevated temperature ranging from 1600° C. to 1800° C. The coated titanium carbide in the form of powder can be formed by depositing a film of titanium nitride on the surface of titanium carbide in the presence of gaseous titanium tetrachloride, hydrogen and nitrogen under the partial pressure of 0.1 to 0.5 atmosphere at 1000° C. to 1500° C. The material can endow the cutting tools with higher toughness and strength and longer life.

6 Claims, No Drawings

SINTERED MATERIAL OF SILICON NITRIDE FOR CUTTING TOOLS AND PROCESS THEREFOR

BACKGROUND OF THE INVENTION

1. Field of the Invention

This invention relates to a sintered ceramic material based on silicon nitride ($Si_3N_4$) which has superior cutting effects for use in machining and a process for producing the material.

2. Prior Art

Ceramics based on silicon nitride have excellent properties such as high strength and hardness at high temperatures and, therefore, they have been used in high temperature structural components.

Recently, some proposals have been made for applying such ceramics to cutting tools. Most of the proposals are concerned with additives to improve their sintering characteristics and strength. Such additives include the following materials: aluminium oxide ($Al_2O_3$), magnesium oxide (MgO), yttrium oxide ($Y_2O_3$) and the like. These additives were used as sintering aids to improve the sintering characteristics. Titanium carbide (TiC), titanium nitride (TiN), titanium carbide-titanium nitride solid solution (TiC,N), tungsten carbide (WC), tantalum carbide (TaC), and tantalum nitride (TaN) were used as additives to enhance the refractoriness abrasion resistance and toughness of sintered silicon nitride.

Ceramic cutting tools sintered with such additives, especially, titanium carbide and/or titanium nitride systems, are known to have excellent characteristics in the aspects of refractoriness, abrasion resistance and toughness. Many proposals have hitherto been made concerning such materials.

For instance, Japanese Laid-Open Patent Publication No. (Sho) 56-32,377 employs aluminium nitride (AlN), alumina ($Al_2O_3$), magnesia (MgO), and silica ($SiO_2$) as additives for silicon nitride material for cutting tools. About 5 to 40 percent by weight of one or two or more of titanium carbide, titanium nitride, and titanium carbide-titanium nitride solid solution are also added to improve its toughness.

Japanese Laid-Open Patent Publication No. (Sho) 58-73,670 (U.S. Pat. No. 4,280,973) discloses a process for preparing a high performance cutting tool using compositions based on silicon nitride with additives such as yttrium oxide ($Y_2O_3$), magnesia (MgO), cerium oxide ($CeO_2$) and zirconium oxide ($ZrO_2$), tungsten (W) and titanium carbide. This patent publication is associated with the following other Japanese Laid-Open Publications: Nos. (Sho) 57-205,374, 57-205,376, 58-95,662, 58-199,782, and 58-213,679 (U.S. Pat. No. 4,425,141).

As disclosed in the publications aforementioned, the cutting tools based on silicon nitride containing titanium carbide are known to have excellent cutting properties as compared with those containing titanium nitride or other additives. However, the silicon nitride tools dispersed with titanium carbide have several disadvantages in that their sinterability is relatively poor due to the formation of by-products during the sintering of the materials which produces less-densified tools.

Therefore, in the field of the relevant industries, the cutting tools have long been desired in which the prior art problems have been effectively eliminated. The applicants have now discovered after intensive research that it is possible to obtain a cutting tool having excellent performance by treating the titanium carbide additive in a special manner which eliminates such serious problems during the sintering. The present invention therefore is based on this discovery.

SUMMARY OF THE INVENTION

The primary object of the invention is to provide sintered ceramic material for use in cutting tools. It is another object of the invention to provide a process for producing the sintered material.

These and other objects of the invention can be attained by providing a sintered material based on silicon nitride for cutting tools which comprises sintering a mixture of silicon nitride containing 2–10 percent by weight of yttrium oxide, 1–5 percent by weight of aluminium oxide and 10–40 percent by weight of titanium carbide coated with titanium nitride.

When a mixture of fine silicon nitride and titanium carbide is sintered under non-oxidizing atmosphere at approximately 1600° to 1800° C. to produce a cutting tool, the following reaction will occur:

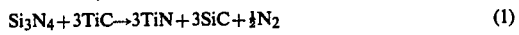

$$Si_3N_4 + 3TiC \rightarrow 3TiN + 3SiC + \tfrac{1}{2}N_2 \qquad (1)$$

This reaction results in the conversion of a part of the titanium carbide into titanium nitride. For the manufacture of tool bits, the reaction is undesirable for the following reasons:

First, in Reaction (1) above, silicon nitride is changed to silicon carbide. The silicon carbide thus produced can be sintered at a temperatures higher than 2000° C. Thus, within a temperature from 1600° to 1800° C., the sintering of silicon nitride, which is densified by a liquid-phase sintering, is interfered in the presence of silicon carbide;

Second, since a portion of the titanium carbide added is converted into titanium nitride, the reaction is carried out against the initial purpose which is to improve the performance of cutting tools by dispersing titanium carbide into silicon nitride; and Third, since the reaction produces nitrogen gas ($N_2$), a number of fine pores are apt to be formed in the product due to the release of the gas. Therefore, the densification is considerably hindered; this may cause a degradation in the performance of the cutting tools.

However, when titanium nitride is used as an enhancing agent for toughness in place of titanium carbide, a reaction such as in Reaction (1) above does not occur. Therefore, sintering of cutting tools based on silicon nitride can be accomplished more easily than that of cutting tools based on titanium carbide; however, titanium nitride is relatively poor in performance due to its lower hardness as compared with titanium carbide.

The physical properties of the materials usually used in cutting tools are shown in Table I below.

TABLE I
PHYSICAL PROPERTIES OF THE MATERIALS USED IN CERAMIC CUTTING TOOLS

| Material | Density (g/cm$^3$) | Hardness (kg/mm$^2$) | Young's Modulus ($10^3$ kg/mm') | Heat Conductivity (cal/cm-sec °C.) | Thermal Expansion Coeff. ($\times 10^{-6}$/°C.) | Melting Point (°C.) |
|---|---|---|---|---|---|---|
| WC | 15.6 | 2150 | 72 | 0.3 | 5.1 | 2900 |
| TiC | 4.94 | 3200 | 35 | 0.04 | 7.6 | 3200 |
| TaC | 14.5 | 1800 | 29 | 0.05 | 6.6 | 3800 |
| NbC | 8.2 | 2050 | 35 | 0.04 | 6.8 | 3500 |
| TiN | 5.43 | 2000 | 26 | 0.07 | 9.2 | 2950 |
| Al$_2$O$_3$ | 3.98 | 2200 | 42 | 0.07 | 8.5 | 2050 |
| CBN | 3.48 | 4500 | 71 | 0.03 | 4.7 | — |
| C | 3.52 | 9000 | 99 | 0.05 | 3.1 | — |

As can be seen from Table I above, titanium carbide has generally superior properties than other materials which are used in cutting tools. Especially, titanium carbide has higher hardness and Young's modulus, which are the most important factors required for cutting tools, than titanium nitride.

When titanium carbide is added to the material of cutting tools having silicon nitride as its matrix, it is desirable that titanium carbide disperses uniformly into the material and does not react with silicon nitride.

In the aforementioned two phenomena, it has been found that although the dispersion of titanium carbide into finely divided silicon nitride is ideal, undesirable side-reactions may prevent the sintering. Although another dispersion of titanium nitride into finely divided silicon nitride can be more easily carried out as compared with the dispersion of titanium carbide, such materials are of relatively poor performance in the aspects of hardness, toughness, and heat resistance in comparison with the sintered materials of silicon nitride with titanium carbide. Consequently, in order to improve the drawbacks found in the above phenomena, the applicants have now found that fine particles of titanium carbide may be coated with a thin titanium nitride film on the surfaces thereof and then added into silicon nitride. Thus, the titanium carbide coated with the titanium nitride film acts like titanium nitride during the sintering; however, in fact, its intrinsic nature is equal to that of the titanium carbide.

Therefore, the technical feature of the invention is the sintering of silicon nitride dispersed with titanium carbide coated with titanium nitride. By this sintering, the particles of titanium carbide coated with titanium nitride and dispersed into silicon nitride act like titanium nitride and are conveniently dispersed without producing nitrogen gas and/or a by-product such as silicon carbide during the sintering. And, furthermore, after the sintering is completed, the particles act like titanium carbide and produce high-performance tool bit. Therefore, relatively easy sintering and manufacturing of an excellent tool bits can be achieved at the same time by using titanium carbide coated with titanium nitride.

The present invention will hereinbelow be described in more detail. First, nitriding of the surfaces of titanium carbide particles into titanium nitride is studied.

In general, titanium nitride is obtained by means of an oxide process, a metal process, a chloride process or the like. In the oxide process, titanium oxide is mixed with carbon in sufficient amount for reduction, and heated at 1600°–1800° C. in the presence of nitrogen or ammonia gas for reduction and nitridation at the same time. However, in the oxide process, it is difficult to obtain high purity of titanium nitride because in the case that nitrogen gas is insufficient or a reducing agent (carbon) is locally flocked, titanium carbon may be produced. To the contrary, the chloride process has widely been employed in coating cutting tools. In this process, titanium tetrachloride is decomposed by reacting it with hydrogen and nitrogen gases simultaneously or ammonia gas to lead it to nitriding and thus to precipitate very fine particles of titanium nitride at a high yield. In this aspect, the chloride process is suitable for coating the surfaces of titanium carbide particles with titanium nitride.

The present invention will now be described by referring to the chloride process previously mentioned. The reaction in which titanium nitride is coated on the surface of titanium carbide can be expressed by the following equation:

$$2TiCl_4 + N_2 + 4H_2 \rightarrow 2TiN + 8HCl \qquad (2)$$

In this reaction, hydrogen, nitrogen and argon gases are used. The hydrogen and nitrogen gases are associated directly with the formation of titanium nitride coatings with titanium tetrachloride. Argon gas is used for purging the reaction chamber such as an electric furnace. Titanium tetrachloride can be evaporated conveniently by bubbling hydrogen gas as a carrier gas into a solution of titanium tetrachloride. During the reaction, the vapor pressure of the titanium tetrachloride varies depending on the reaction temperature and the flow rate of the hydrogen gas and, therefore, the flow rate of the titanium tetrachloride vaporized may be controlled by the flow rate of the hydrogen gas and the temperature of the titanium tetrachloride solution. In order to prevent the titanium tetrachloride solution from being condensed, the container of the titanium tetrachloride solution must be maintained at 50° C. and the reaction system at which after titanium tetrachloride and nitrogen gas are mixed with each other is maintained at 200° C.

Coating is preferably carried out by heating fine particles of titanium carbide in an electric furnace under titanium tetrachloride gas from a titanium tetrachloride evaporizer, and hydrogen, argon and nitrogen gases at 1000°–1200° C. to deposit titanium nitride on the surfaces of fine particles of titanium carbide and then gradually cooling the particles of titanium carbide and then by gradually cooling the deposited material to room temperature. For this process, it is recommended that the partial pressures of titanium tetrachloride and hydrogen be maintained within the range of 0.1 to 0.5 atmospheres, while the partial pressures of argon and nitrogen is maintained within the range of 0.3 and 0.7 atmospheres. The total gas pressure in the reaction chamber is maintained at one atmosphere. When the partial pressures of titanium tetrachloride and hydrogen are maintained within the range of 0.1 to 0.5 atmospheres, the particles of titanium carbide have good coated layer of titanium nitride on its surface with reasonable controllable rate. When the partial pressure of titanium tetrachloride and hydrogen is either below or above the range of 0.1 to 0.5 atmosphere, the coating rate is either too slow or too fast, respectively, to have good uniform coating with reasonable controllable rate.

In addition, in accordance with another aspect of the invention, it is possible to deposit titanium nitride on titanium carbide by a direct reaction of titanium carbide with nitrogen. The reaction may be expressed by the following equation:

$$2TiC + N_2 + 4H_2 \rightarrow 2TiN + 2CH_4 \qquad (3)$$

In this reaction, the titanium carbide surface is mainly subjected to nitriding. Since titanium nitride is more stable than titanium carbide, titanium carbide is reacted with nitrogen gas to convert the carbide to a nitride. At this time, the hydrogen gas is needed to remove carbon. In this reaction system, the partial pressure of hydrogen gas may be an important factor to control the formation of the nitride coating on titanium carbide. In carrying out this process, finely divided titanium carbide particles are thinly distributed within an electric furnace and then reacted for 2 hours with a mixed gas of nitrogen and hydrogen introduced into the furnace at 1000°-1500° C. maintaining the partial pressure of hydrogen at 0.001-0.01 atmosphere; this surely results in the conversion of the titanium carbide into titanium nitride.

To silicon nitride, 20 W/O of titanium nitride-coated titanium carbide obtained from the above process is added, and then 1-5 percent by weight of aluminium oxide and 1-8 W/O of yttrium oxide are added by stirring with methyl alcohol. Subsequently, the mixture is mixed in a ball mill for about 16 hours and dried at 110° C. Fine particles from this stage, that is, fine particles having a particle size ranging from −60 mesh to +100 mesh are hot pressed and sintered for 1-2 hours at 1600°-1800° C. under 350 kg/cm² to make a cutting tool. In this case, the hot pressed product is machined into precise forms to be used in actual cutting. However, the hardness of hot pressed product is very high and its machining is very difficult and costly. Therefore, in order to facilitate mass production, the use of hot isostatic pressing is essentially required. For this purpose, the specimen of the product is molded and pre-sintered in the predetermined form and subject to hot isostactic processing without using any container. As a consequence, a cutting tool based on silicon nitride of high performance can be produced economically, since in accordance with the above-mentioned method, minimum machining is required and mass production is feasible.

PREFERRED EMBODIMENTS OF THE INVENTION

The present invention may be more fully understood from the following examples, which are given by way of illustration and not by way of limitation.

EXAMPLE 1

100 Grams of finely divided titanium carbide having an average particle size of 7 microns m were charged into a pyrolite silicon carbide electric furnace. With introducing a mixture of nitrogen and hydrogen gases into the furnace at 2 L/min., while varying their partial pressure to 0.001, 0.003, 0.005, and 0.01 atmosphere, the furnace was heated at 1500° C. for 2 hours to allow titanium nitride deposition on the surface of titanium carbide.

Yttrium oxide was pulverized alone for 8 hours in an alumina ball mill. 6 Grams of the yttrium oxide in the finely divided form thus obtained and 2 grams of alumina were uniformly dispersed in methyl alcohol by stirring for 15 minutes. To this mixture, 75 grams of silicon nitride was added. The resulting mixture was further mixed together with 28 grams of the titanium carbide powder obtained above, pulverized for 16 hours in an alumina ball mill and finally dried at 110° C. From among the sample products thus prepared, pulverized materials having a particle size ranging from −60 mesh to +100 mesh were taken up as a raw material for sintering.

To prevent undesirable reactions between a graphite mold and the raw material, powdered boron nitride (BN) was thinly applied on the surface of the mold. 20 Grams of the raw material were charged in the mold of 3 cm in diameter and was subject to hot isostatic pressing for 1 hour at 1700° C. and 1750° C. to produce cutting tools.

The performance of the cutting tool was tested through actual machining. The cutting was conducted by using FC 25 cast iron as a material to be cut with a cutting speed of 300 m/min., a feeding rate of 0.3 mm/rev. and a cutting depth of 2.0 mm. By cutting the material until the crater formation and the flank wear of the cutting tool reached to 0.1 mm and 0.4 mm, respectively, the relative life of the tool was determined. The results are illustrated in Table II below.

TABLE II

| | PHYSICAL PROPERTIES OF A CUTTING TOOL FROM SILICON NITRIDE-TITANIUM CARBIDE | | | | | |
|---|---|---|---|---|---|---|
| Sample | Partial Pressure of $H_2$ (atm.) for TiC treatment | Hot Pressing Temperature (°C.) | Relative Density (%) | Modulus of Rupture (kg/cm²) | Toughness (MN/m 3/2) | Hardness (HrA) |
| Invention | | | | | | |
| 1 | 0.001 | 1700 | 96.7 | 8500 | 4.7 | 92.8 |
| 2 | 0.003 | 1700 | 98.2 | 9000 | 4.7 | 93.1 |
| 3 | 0.005 | 1700 | 99.6 | 9400 | 4.9 | 92.7 |
| 4 | 0.10 | 1700 | 99.0 | 9300 | 5.1 | 93.2 |
| 5 | 0.001 | 1750 | 97.8 | 9000 | 4.6 | 91.9 |
| 6 | 0.003 | 1750 | 98.9 | 9300 | 4.8 | 93.3 |
| 7 | 0.005 | 1750 | 99.9 | 9500 | 4.9 | 92.8 |
| 8 | 0.01 | 1750 | 99.6 | 9500 | 5.0 | 92.5 |
| Control | | | | | | |
| 9 | Not-treated | 1700 | 96.8 | 8700 | 4.3 | 92.6 |
| 10 | Not-treated | 1750 | 97.4 | 8900 | 4.6 | 92.0 |

EXAMPLE 2

In this example, the chloride process aforementioned was used to obtain titanium carbide coated with titanium nitride.

50 Grams of pulverized titanium carbide having an average particle size of 7 microns were charged in an induction furnace. The pulverized titanium carbide was nitrided with titanium tetrachloride under agitation while introducing nitrogen and hydrogen gases into the furnace. By controlling the reaction temperature to 1050° C. and 1100° C. and the partial pressure of titanium tetrachloride to 0.2 atmosphere, 0.3 atm. and 0.5 atmosphere, the product of titanium nitride-coated titanium carbide powder was obtained.

The powder thus produced was added, in the same proportion as used in Example 1, to increase toughness to a composition based on silicon nitride including alumina and yttrium oxide. The resulting mixture was subject to sintering for 1 hour at 1750° C. under nitrogen atmosphere followed by hot isostatic pressing for 1 hour at 1750° C. under 200 kg/cm² of nitrogen pressure to obtain a cutting tool.

The cutting tool was tested using FC 25 cast iron as a material to be cut with a cutting speed of 300 m/min., a feeding rate of 0.3 mm/rev. and a cutting depth of 2.0 mm. By cutting the material until the crater formation and the flank wear of the cutting tool reached to 0.1 mm and 0.4 mm, respectively, the relative life of the tool was determined. The results are shown in Table III below.

TABLE III

RELATIVE-LIFE OF A CUTTING TOOLS FROM SILICON NITRIDE-TITANIUM CARVIDE

| Sample | Nitriding Temperature (°C.) | Partial Pressure of TiCl$_4$ (atm.) | Partial Pressure of H$_2$ (atm.) | Hot Isostatic Pressing and Temperature (°C.) | Relative-life (Min.) |
|---|---|---|---|---|---|
| Invention | | | | | |
| 11 | 1050 | 0.2 | 0.3 | 1750 | 60 |
| 12 | 1050 | 0.2 | 0.5 | 1750 | 65 |
| 13 | 1050 | 0.4 | 0.3 | 1750 | 71 |
| 14 | 1050 | 0.4 | 0.5 | 1750 | 79 |
| 15 | 1100 | 0.2 | 0.3 | 1750 | 76 |
| 16 | 1100 | 0.2 | 0.5 | 1750 | 75 |
| 17 | 1100 | 0.4 | 0.3 | 1750 | 72 |
| 18 | 1100 | 0.4 | 0.5 | 1750 | 81 |
| Control | | | | | |
| 10 | Not-treated | Not-treated | Not-treated | 1750 | 57 |

What is claimed is:

1. A sintered material based on silicon nitride consisting essentially of 2 to 10 percent by weight of yttrium oxide, 1 to 5 percent by weight of aluminium oxide, 10 to 40 percent by weight of titanium carbide coated with titanium nitride and the balance of silicon nitride which has been subjected to hot pressing at elevated temperatures of 1600° C. to 1800° C.

2. The sintered material of claim 1, wherein said titanium carbide coated with titanium nitride is formed by depositing titanium nitride on the surface of titanium carbide.

3. A process for preparing a sintered material based on silicon nitride comprising sintering and hot isostatic pressing a mixture of 2 to 10 percent by weight of yttrium oxide, 1 to 5 percent by weight of aluminium oxide and 10 to 40 percent by weight of titanium carbide coated with titanium nitride in powder form at elevated temperatures of 1600° C. to 1800° C.

4. The process of claim 3, wherein said titanium carbide coated with titanium nitride is formed by depositing a film of titanium nitride on the surface of titanium carbide under the action of gaseous titanium tetrachloride, hydrogen, argon and nitrogen.

5. The process of claim 4, wherein the partial pressure of each of titanium tetrachloride and hydrogen during said deposition is in the range of 0.1 and 0.5 atmosphere, the partial pressure of each of argon and nitrogen during said deposition is in the range of 0.3 to 0.7 atmosphere, and the reaction temperature ranges from 1000° C. to 1200° C.

6. The process of claim 3, wherein said titanium carbide coated with titanium nitride is formed by nitriding titanium carbide on its surface and wherein the partial pressure of hydrogen during said deposition is in the range of 0.001 to 0.01 atmospheres, the partial pressure of nitrogen in the range of 0.99 to 0.999 atmospheres and the reaction temperature ranges from 1000° C. to 1500° C.

* * * * *